Patented Mar. 28, 1950

2,502,397

UNITED STATES PATENT OFFICE 2,502,397

ICE CREAM AND STABILIZER THEREFOR

Sanford Joseph Werbin, New York, N. Y., assignor to Stein, Hall & Company, Inc., New York, N. Y., a corporation of New York No Drawing. Application October 22, 1946, Serial No. 704,998

6 Claims. (Cl. 99—136)

My present invention relates generally to foods, and has particular reference to the stabilization of ice cream and ice cream mixes.

In the manufacture of a food product of this character, it is customary commercial practice to incorporate an added ingredient whose function it is to stabilize the emulsion or suspension, to prevent undesired separation or uneven distribution of fats and other solids, and to impart the proper body, smoothness, uniformity, and other desirable features to the product.

My present invention is predicated upon the discovery that guar seed gum has unusually good capabilities toward achieving this purpose, and is in a number of respects more advantageous and economical than other natural gums and other stabilizing materials which have heretofore been used.

Guar is known botanically as *Cyamopsis psoralioides* (*C. proraloids* or *C. tetragonaloba*). It is a legume and the seeds grow in pods about 2 inches long containing about one-half dozen pebble shaped seeds. Guar seed gum is obtained from the endosperm of the guar seed. Guar seed gum consists chiefly of mannogalactan, which is a powerful colloid having high water-absorptive properties. One of its advantages lies in its ready solubility in water at relatively low temperatures, whereby its use as a stabilizer of an ice cream mix results in somewhat less "wheying off" than would occur with a less soluble material.

To enhance the stabilizing effect, and to obviate such undesirable separation as may be likely to occur during holding or storage of the stabilized mixture, the guar seed gum is preferably employed in intermixture with Irish moss. Either the ground crude moss, or a purified extract, or a combination of both, may be used.

Irish moss is itself a well-known stabilizer and has been employed singly, or in combination with other ingredients, for stabilizing purposes. However, because of the high viscosity which it produces, Irish moss is seldom used by itself in unmodified form, and, generally speaking, it is desirable to utilize it as sparingly as possible. I have found that the excellent stabilizing properties of guar seed gum as a main stabilizing instrumentality make it feasible to use Irish moss to a minimum extent. In accordance with my invention, a good stabilizing result is achieved by means of a mixture in which the guar seed gum constitutes about 50% to 85% of the mixture, the balance being Irish moss.

An example of the present improved stabilizing mixture is as follows:

I

|  | Per cent |
|---|---|
| Guar seed gum | 84.6 |
| Irish moss, refined | 15.4 |
|  | 100.0 |

This mixture produces the desired result when it is added in relatively minute quantity (0.13%) to an ice cream mix. That is, for each 1000 pounds of the ice cream mix, 1.3 pounds of the stabilizing mixture are employed.

A slightly larger amount of stabilizer (0.19%) is used when it is composed as follows:

II

|  | Per cent |
|---|---|
| Guar seed gum | 57.9 |
| Irish moss, ground crude | 42.1 |
|  | 100.0 |

That is, for each 1000 pounds of ice cream mix, 1.9 pounds of this stabilizing mixture are used.

Generally, it is preferable to blend the stabilizing mixture with an extending agent such as sucrose, dextrose, soya flour, or the like, or with combinations of such materials, whereby a larger amount of the extended mixture may be added to the ice cream mix, thereby simplifying the weighing and mixing procedures. In each case, however, the relative proportions of the guar seed gum and of the Irish moss remain the same as in the illustrative examples specified, the guar seed gum always constituting at least 50%, and the Irish moss constituting the balance, of the basic intermixture of guar and Irish moss.

An illustrative stabilizing mixture of the extended type mentioned is as follows:

III

|  | Per cent |
|---|---|
| Guar seed gum | 55.0 |
| Irish moss, refined | 10.0 |
| Dextrose | 35.0 |
|  | 100.0 |

In this formula, it will be observed that the ratio of guar to Irish moss is 5.5 to 1, corresponding, in percentage, to Formula I hereinbefore given.

As an example of one complete procedure, employing the stabilizer of Formula III in the manufacture of ice cream, a stabilized ice cream mix may be prepared of the following ingredients, in substantially the proportions mentioned:

IV

| | Per cent |
|---|---|
| Cream (40% fat) | 26.0 |
| Milk (4% fat) | 41.8 |
| Skim condensed milk | 17.0 |
| Sugar | 15.0 |
| Stabilizer (Formula III above) | 0.2 |
| | 100.0 |

This mix is pasteurized at about 150–160° F. and otherwise treated in the usual way. The resultant product is stable, shows no tendency toward separation on holding, and handles well in processing. Its "overrun" qualities are good, and it whips readily and easily. The resultant ice cream exhibits a uniform and fine incorporation of air, its texture is smooth and light, it is admirably resistant to heat shock, and it manifests a uniform and slow melt-down.

It will be understood that, in commercial practice, the stabilizing composition may be manufactured, sold, and dealt with as an independent commodity. Such a stabilizing mixture may also enter into the composition of preliminary mixtures, such as chocolate syrups, which are sold merely as a base for the subsequent preparation of ice cream or the like.

In general, it will be understood that changes in the details herein described for the purpose of explaining the nature of the invention may be made by those skilled in the art without necessarily departing from the sipirit and scope of the invention as expressed in the appended claims.

Having thus described my invention and illustrated its use, what I claim as new and desire to secure by Letters Patent is:

1. An ice cream mix, stabilized by the presence of a relatively small quantity of guar seed gum.

2. An ice cream mix, stabilized by the presence of a relatively small quantity of a mixture of guar seed gum and Irish moss.

3. An ice cream mix, stabilized by the presence of a relatively small quantity of a mixture of guar seed gum and Irish moss, the guar seed gum constituting between 50% and 85% of the mixture.

4. An ice cream mix stabilized by the presence of no more than approximately 0.2% of a mixture consisting essentially of guar seed gum and including Irish moss as a minor ingredient.

5. An ice cream stabilizing composition comprising guar seed gum and Irish moss, the guar seed gum constituting at least 50% of the composition.

6. An ice cream stabilizing composition comprising guar seed gum and Irish moss, the guar seed gum constituting between 50% and 85% of the composition.

SANFORD JOSEPH WERBIN.

REFERENCES CITED

The following references are of record in the file of this patent:

UNITED STATES PATENTS

| Number | Name | Date |
|---|---|---|
| 2,007,218 | Seltzer | July 9, 1935 |
| 2,097,225 | Green et al. | Oct. 26, 1937 |
| 2,103,411 | Frieden | Dec. 28, 1937 |
| 2,355,547 | Musher | Aug. 8, 1944 |
| 2,444,412 | Swanson | July 6, 1948 |